(12) United States Patent
Johnson

(10) Patent No.: US 12,515,825 B2
(45) Date of Patent: *Jan. 6, 2026

(54) DEVICE INCLUDING INTERCHANGEABLE PORT OPENING DOCKING MECHANISMS, AND ASSOCIATED SYSTEMS AND METHODS

(71) Applicant: BLUE ORIGIN MANUFACTURING, LLC, Huntsville, AL (US)

(72) Inventor: Michael D. Johnson, Bastrop, TX (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,813

(22) Filed: Jul. 9, 2024

(65) Prior Publication Data
US 2024/0359832 A1    Oct. 31, 2024

Related U.S. Application Data

(63) Continuation of application No. 18/079,819, filed on Dec. 12, 2022, now Pat. No. 12,037,143, which is a
(Continued)

(51) Int. Cl.
*B64G 1/64*    (2006.01)
*B64G 1/60*    (2006.01)

(52) U.S. Cl.
CPC ............ *B64G 1/6462* (2023.08); *B64G 1/60* (2013.01)

(58) Field of Classification Search
CPC ... B64G 1/22; B64G 1/60; B64G 1/64; B64G 1/641; B64G 1/646; B64G 1/6462
See application file for complete search history.

(56) References Cited

U.S. PATENT DOCUMENTS 933,070  A    9/1909  Gleason
2,807,429  A    9/1957  Hawkins et al.
(Continued)

FOREIGN PATENT DOCUMENTS

KR    100779798 B1    11/2007
KR    20140002805 U    5/2014

OTHER PUBLICATIONS

Ito et al., "Optimal Design of a Mechanism Used for Opening and Shutting a Ship's Hatch Cover". J. Mech., Trans., and Automation. Dec. 1984, 106(4), 7 pages.
(Continued)

*Primary Examiner* — Richard Green
(74) *Attorney, Agent, or Firm* — Hogan Lovells US LLP

(57) ABSTRACT

A representative device includes a housing having a common port opening, a first connecting element carried by the housing and positioned to connect with a corresponding first spacecraft connecting structure having a first configuration, and a second connecting element carried by the housing and positioned to connect with a corresponding second spacecraft connecting structure having a second configuration different than the first configuration. At least one of the first and second connecting elements is moveable relative to the other between an operational position and a non-operational position, and each of the first and second connecting elements, when connected to the corresponding first or second spacecraft connecting structure, is positioned to allow transport through the common port opening.

20 Claims, 7 Drawing Sheets

Related U.S. Application Data continuation of application No. 16/283,397, filed on Feb. 22, 2019, now Pat. No. 11,560,243.

(56) References Cited

U.S. PATENT DOCUMENTS

| | | |
|---|---|---|
| 3,814,350 A | 6/1974 | Fletcher et al. |
| 3,966,142 A | 6/1976 | Corbett et al. |
| 4,479,622 A | 10/1984 | Howse |
| 4,601,446 A | 7/1986 | Opsahl |
| 4,608,926 A | 9/1986 | Stevens |
| 4,842,223 A | 6/1989 | Allton et al. |
| 4,854,010 A | 8/1989 | Maraghe et al. |
| 4,964,340 A | 10/1990 | Daniels et al. |
| 5,052,638 A | 10/1991 | Minovitch |
| 5,104,070 A | 4/1992 | Johnson et al. |
| 5,242,135 A | 9/1993 | Scott |
| 5,318,256 A | 6/1994 | Appleberry |
| 5,372,071 A | 12/1994 | Richards et al. |
| 5,568,901 A | 10/1996 | Stiennon |
| 5,628,476 A | 5/1997 | Soranno et al. |
| 5,667,167 A | 9/1997 | Kistler |
| 5,678,784 A | 10/1997 | Marshall et al. |
| 5,743,492 A | 4/1998 | Chan et al. |
| 5,816,539 A | 10/1998 | Chan et al. |
| 5,898,123 A | 4/1999 | Fritz et al. |
| 5,927,653 A | 7/1999 | Mueller et al. |
| 6,053,454 A | 4/2000 | Smolik et al. |
| 6,176,451 B1 | 1/2001 | Drymon |
| 6,193,187 B1 | 2/2001 | Scott et al. |
| 6,206,327 B1 | 3/2001 | Benedetti et al. |
| 6,220,546 B1 | 4/2001 | Klamka et al. |
| 6,247,666 B1 | 6/2001 | Baker et al. |
| 6,354,540 B1 | 3/2002 | Lewis et al. |
| 6,357,699 B1 | 3/2002 | Edberg et al. |
| 6,364,252 B1 | 4/2002 | Anderman |
| 6,454,216 B1 | 9/2002 | Kiselev et al. |
| 6,457,306 B1 | 10/2002 | Abel et al. |
| 6,666,402 B2 | 12/2003 | Rupert et al. |
| 6,817,580 B2 | 11/2004 | Smith |
| 6,926,576 B1 | 8/2005 | Alway et al. |
| 7,543,779 B1 | 6/2009 | Lewis et al. |
| 8,393,582 B1 | 3/2013 | Kutter et al. |
| 8,695,473 B2 | 4/2014 | Kametz et al. |
| 8,727,654 B2 | 5/2014 | Graham |
| 9,302,793 B2 | 4/2016 | Ghofranian et al. |
| 9,796,488 B2 | 10/2017 | Cook et al. |
| 9,963,250 B2 | 5/2018 | Bultel |
| 10,189,556 B2 | 1/2019 | Minchau et al. |
| 10,279,933 B2 | 5/2019 | Lakshmanan et al. |
| 10,351,268 B2 | 7/2019 | Estevez et al. |
| 10,407,965 B2 | 9/2019 | Alford et al. |
| 10,689,133 B2 | 6/2020 | Cheynet De Beaupre et al. |
| 11,053,031 B2 | 7/2021 | Liu et al. |
| 11,560,243 B2 * | 1/2023 | Johnson ............ B64G 1/646 |
| 12,037,143 B2 * | 7/2024 | Johnson ............ B64G 1/645 |
| 2003/0150961 A1 | 8/2003 | Boelitz et al. |
| 2003/0192984 A1 | 10/2003 | Smith |
| 2005/0278120 A1 | 12/2005 | Manfred et al. |
| 2006/0049316 A1 | 3/2006 | Antonenko et al. |
| 2006/0113425 A1 | 6/2006 | Rader |
| 2007/0012820 A1 | 1/2007 | Buehler |
| 2010/0213244 A1 | 8/2010 | Miryekta et al. |
| 2013/0221162 A1 | 8/2013 | Darooka |
| 2017/0225808 A1 | 8/2017 | Echelman et al. |
| 2017/0327252 A1 | 11/2017 | Lim et al. |
| 2018/0055227 A1 | 3/2018 | Jones et al. |
| 2018/0186479 A1 | 7/2018 | Johnson et al. |
| 2020/0024011 A1 | 1/2020 | Isayama |
| 2020/0102102 A1 * | 4/2020 | Liu ............ B64G 1/646 |
| 2020/0270002 A1 | 8/2020 | Johnson |
| 2020/0307461 A1 | 10/2020 | Johnson |
| 2021/0031952 A1 | 2/2021 | Moran et al. |
| 2022/0388695 A1 | 12/2022 | Patty et al. |

OTHER PUBLICATIONS

Kelly et al., International Docking Standard (IDSS) Interface Definition Document (IDD), No. HQ-E-DAA-TN39050, Oct. 2016, 142 pages.

Restriction Requirement issued in U.S. Appl. No. 18/079,819, dated Aug. 18, 2023.

Non-Final Office Action issued in U.S. Appl. No. 18/079,819, dated Nov. 27, 2023.

Notice of Allowance issued in U.S. Appl. No. 18/079,819, dated Mar. 20, 2024.

Restriction Requirement issued in U.S. Appl. No. 16/283,397, dated Dec. 20, 2021.

Non-Final Office Action issued in U.S. Appl. No. 16/283,397, dated Jul. 29, 2022.

Notice of Allowance issued in U.S. Appl. No. 16/283,397, dated Oct. 26, 2022.

* cited by examiner

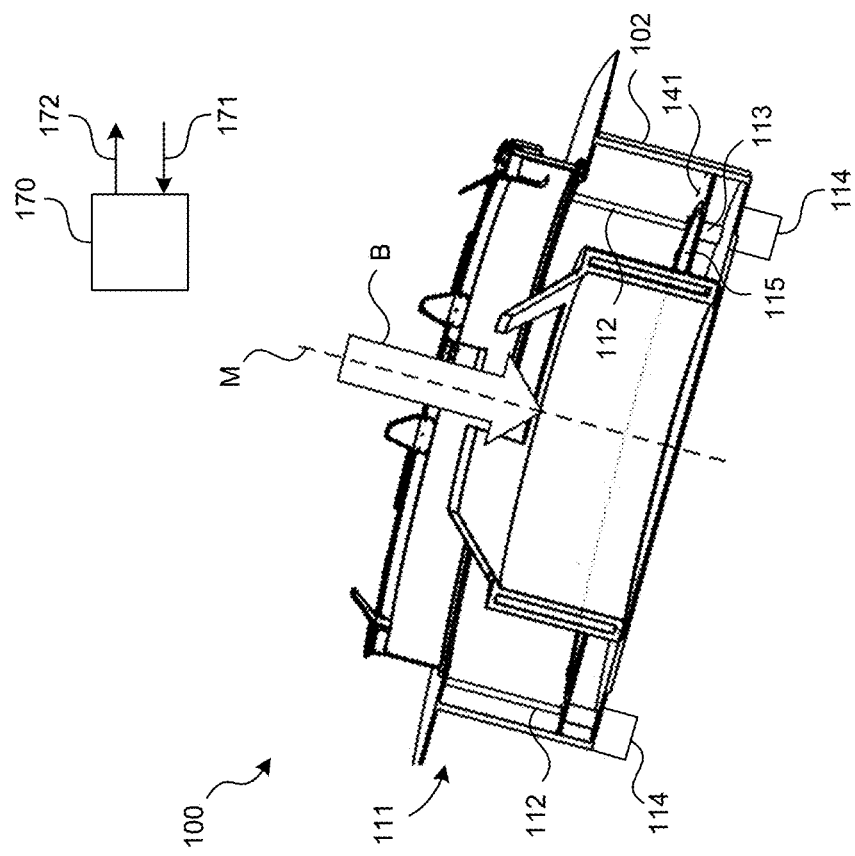
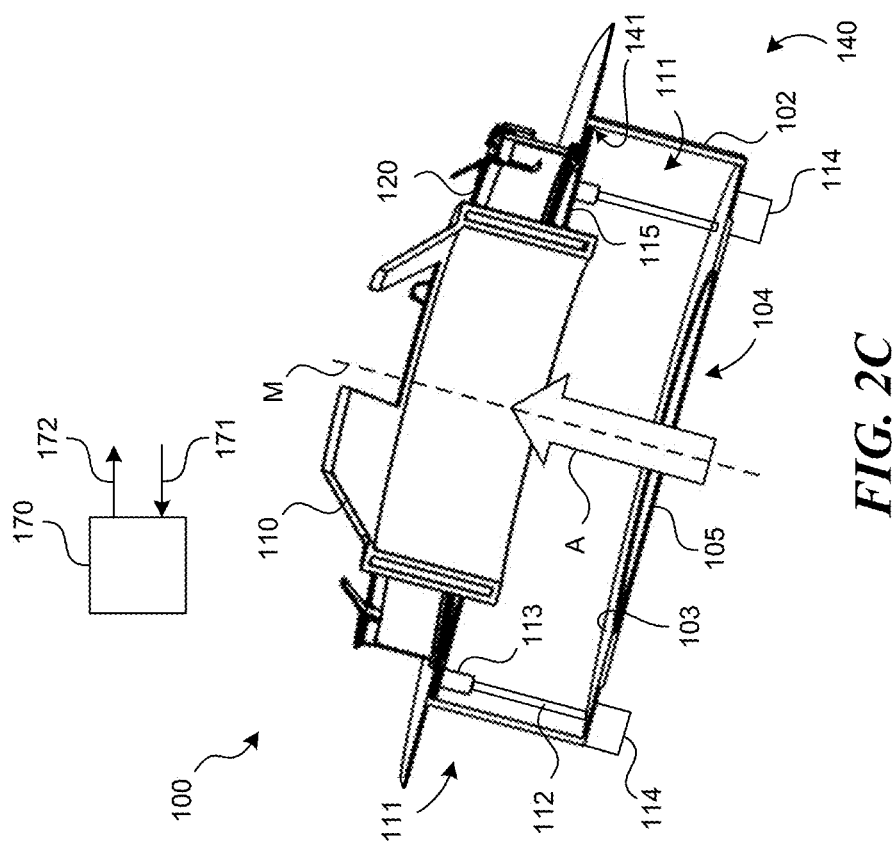
FIG. 2C
FIG. 2D

DEVICE INCLUDING INTERCHANGEABLE PORT OPENING DOCKING MECHANISMS, AND ASSOCIATED SYSTEMS AND METHODS

INCORPORATION BY REFERENCE TO RELATED APPLICATION(S)

Any and all applications for which a foreign or domestic priority claim is identified in the Application Data Sheet as filed with the present application are hereby incorporated by reference under 37 CFR 1.57. For example, this is a continuation application that is related to and that claims the benefit of priority from allowed U.S. patent application Ser. No. 18/079,819, filed Dec. 12, 2022, entitled "SPACECRAFT MULTIFUNCTION CONNECTING MECHANISMS INCLUDING INTERCHANGEABLE PORT OPENING DOCKING MECHANISMS, AND ASSOCIATED SYSTEMS AND METHODS," which is a continuation application that is related to and that claims the benefit of priority from issued U.S. patent application Ser. No. 16/283,397, filed Feb. 22, 2019, now U.S. Pat. No. 11,560,243, entitled "SPACECRAFT MULTIFUNCTION CONNECTING MECHANISMS INCLUDING INTERCHANGEABLE PORT OPENING DOCKING MECHANISMS, AND ASSOCIATED SYSTEMS AND METHODS," the entire contents of both are incorporated by reference herein and form a part of this specification for all purposes.

TECHNICAL FIELD

The present technology is directed generally to spacecraft multifunction connecting mechanisms, and associated systems and methods.

BACKGROUND

It is well known in the prior art that spacecraft may be attached to each other using various devices. Previous spacecraft have used docking mechanisms, typically including a male portion (e.g., a probe) and a female portion (e.g., drogue) that connect spacecraft together and permit transfer of resources, cargo, and crew between the spacecraft.

Other docking mechanisms are androgynous in nature (i.e., have no male or female half) that connect spacecraft together and permit transfer of resources, cargo, and crew between the spacecraft. For example, the Androgynous Peripheral Attach System (APAS) docking system and the International Berthing and Docking Mechanism (IBDM) are both androgynous in nature.

The docking mechanisms are attached to each other using a docking process in which two rendezvousing spacecraft are joined together when one spacecraft connects with the others with one or both maneuvering relative to each other. This permits the docking mechanisms to mechanically join by electrically driving threaded bolts into floating nuts. The joined docking mechanisms create a volume between the two that can later be pressurized for transport of crew and/or cargo through the docking mechanism assembly.

The International Space Station (ISS) uses Common Berthing Mechanisms (CBMs) consisting of a male (Active Common Berthing Mechanism or ACBM) and a female (Passive Common Berthing Mechanism or PCBM) portion that connect the spacecraft together and permit transfer of resources, cargo, and crew between the spacecraft.

The CBMs are attached to each other using a process called berthing. Berthing is a process in which two rendezvousing spacecraft are joined together by having one spacecraft capture the other using a robotic arm, and then using the robotic arm to maneuver the two spacecraft CBMs together. This permits the CBMs to mechanically join by electrically driving threaded bolts (on the ACBM side) into floating nuts (on the PCBM side). Joining the CBMs creates a volume between the ACBM and the PCBM that can later be pressurized for transport of crew and/or cargo through the CBM assembly.

Prior docking and berthing mechanisms are generally satisfactory for their specific functions, but there remains a need in the industry for improved and/or more versatile docking systems.

BRIEF DESCRIPTION OF THE DRAWINGS

FIGS. 2C and 2D illustrate further details of actuating mechanisms and seals, with the first connecting element extended (FIG. 2C) and the first connecting element retracted (FIG. 2D), in accordance with embodiments of the present technology.

DETAILED DESCRIPTION

Figure 1A:
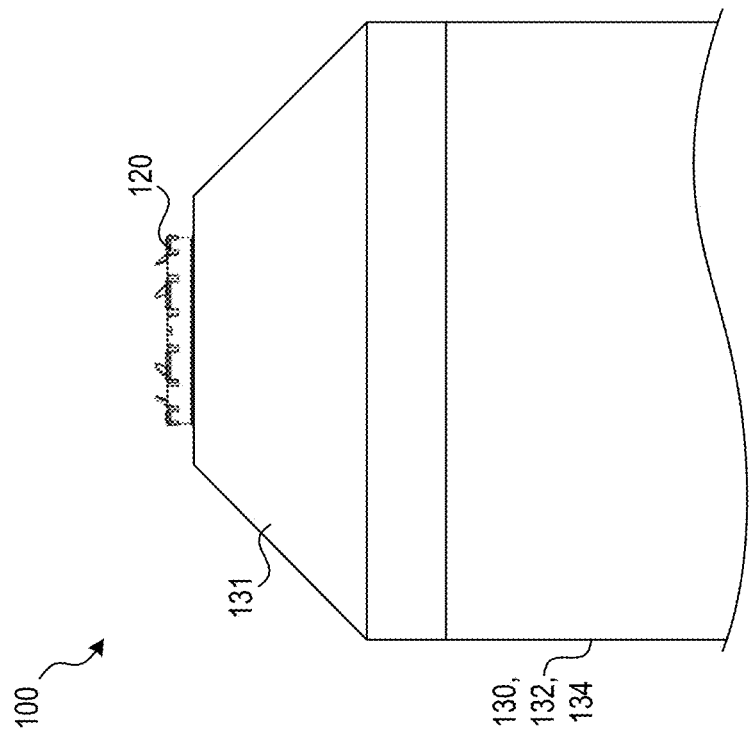
FIG. 1A is a partially schematic, side elevation view of a system that includes first and second connecting elements carried by a space vehicle in accordance with embodiments of the present technology.

Several embodiments of the present technology are directed to spacecraft multi-function connecting mechanisms, and associated systems and methods. In some embodiments, the systems can include connecting mechanisms that interface with multiple corresponding mechanisms having different configurations. Accordingly a single docking system having a single port can include multiple connecting devices, each of which is compatible with a different corresponding connecting device. This arrangement can allow a single docking system to be used with multiple spacecraft, each having different docking mechanism configurations. In particular embodiments, the connecting devices are arranged concentrically around a common port, to facilitate using a single port despite the presence of multiple, different connecting mechanisms.

Several details describing structures and/or processes that are well-known and often associated with spacecraft systems, but that may unnecessarily obscure some significant aspects of the presently disclosed technology, are not set forth in the following description for purposes of clarity. Moreover, although the following disclosure sets forth several embodiments of the present technology, several other embodiments can have different configurations and/or different components than those described in this section. As such, the present technology may have other embodiments with additional elements, and/or without several of the elements described below with reference to FIGS. 1A-6B.

Several embodiments of the technology described below may take the form of computer—or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

Several of the features are described below with reference to particular corresponding Figures. Any of the features described herein may be combined in suitable manners with any of the other features described herein, without deviating from the scope of the present technology.

In the present disclosure, the following acronyms are used:

ISS=International Space Station
IDS=International Docking System.
CBM=Common Berthing Mechanism: used on the International Space Station to mate/berth two pressurized elements on—orbit.
PCBM=Passive Common Berthing Mechanism
ACBM=Active Common Berthing Mechanism.
IBDM=International Berthing and Docking Mechanism One drawback with the current technology is that different spacecraft and/or space structures use different docking mechanisms, and, in some cases, the same space structure uses multiple different docking mechanisms. For example, NASA currently uses the IBDM configuration to dock spacecraft to the ISS, and also uses the CBM configuration to berth spacecraft to the ISS. An advantage of embodiments of the present technology, described further below, is that a particular spacecraft (e.g., a crew and/or cargo capsule) can include a single docking system that is compatible with multiple corresponding docking systems. This arrangement can simplify, and/or make more versatile, the spacecraft on which it is positioned.

FIG. 1A is a partially schematic, side elevation view of a system 100 that includes a space vehicle 130 having a bulkhead 131. The system 100 further includes a first connecting element 110 and a second connecting element 120, each configured to couple the vehicle 130 to another space structure (e.g., a space vehicle), via a different type of connecting mechanism. Accordingly, the same vehicle 130 can be connected to multiple other space vehicles, space stations, and/or other space-based structures that may have different types of docking mechanisms. In a particular embodiment, the first connecting element 110 has an International Berthing and Docking Mechanism (IBDM) configuration, and the second connecting element 120 has a Common Berthing Mechanism (CBM) configuration. In a further particular aspect of an embodiment shown in FIG. 1A, the second connecting element 120 has a Passive Common Berthing Mechanism (PCBM) configuration. In other embodiments, the second connecting element 120 can have an Active Common Berthing Mechanism (ACBM) configuration. In still further embodiments, the first connecting element 110 and/or the second connecting element 120 can have different configurations than are shown in FIG. 1A. In any of these arrangements, the first connecting element and the second connecting element differ from each other, and are each compatible with different spacecraft connecting structure configurations.

Figure 1B:
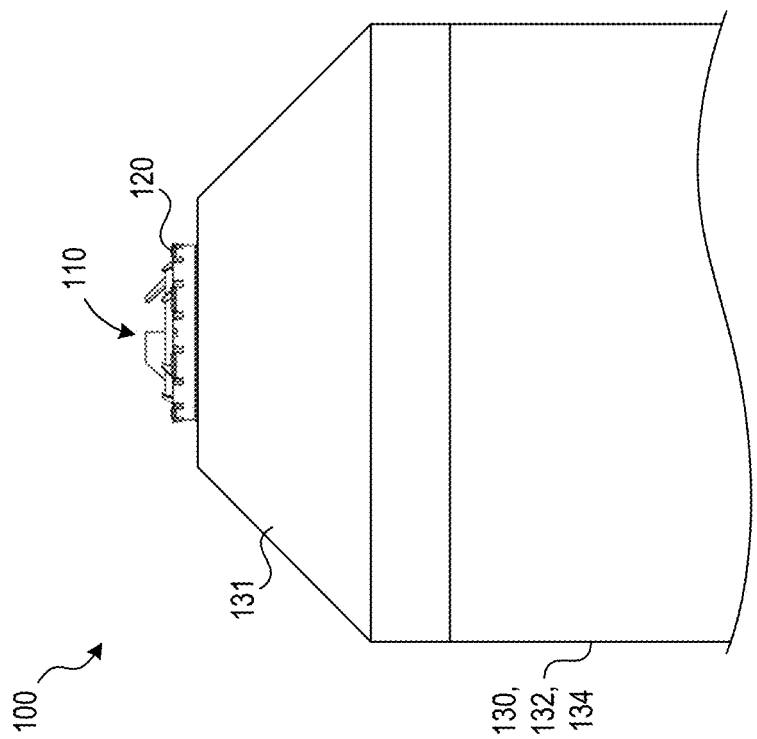
FIG. 1B is a partially schematic, side elevation view of the system shown in FIG. 1A, with the first connecting element retracted in accordance with embodiments of the present technology.

In several representative embodiments, the first connecting element 110 and/or the second connecting element 120 moves relative to the other so that one or the other connecting element is positioned for connecting with a corresponding structure (e.g., another spacecraft or space station). For example, as shown in FIG. 1A, the first connecting element 110 projects further from the bulkhead 131 than does the second connecting element 120, and is accordingly in position to dock with another corresponding connecting element having a compatible configuration. In FIG. 1B, the first connecting element 110 is no longer visible, and has instead been retracted so that the second connecting element 120 is positioned for connecting to a corresponding spacecraft structure having a different docking configuration.

Figure 2B:
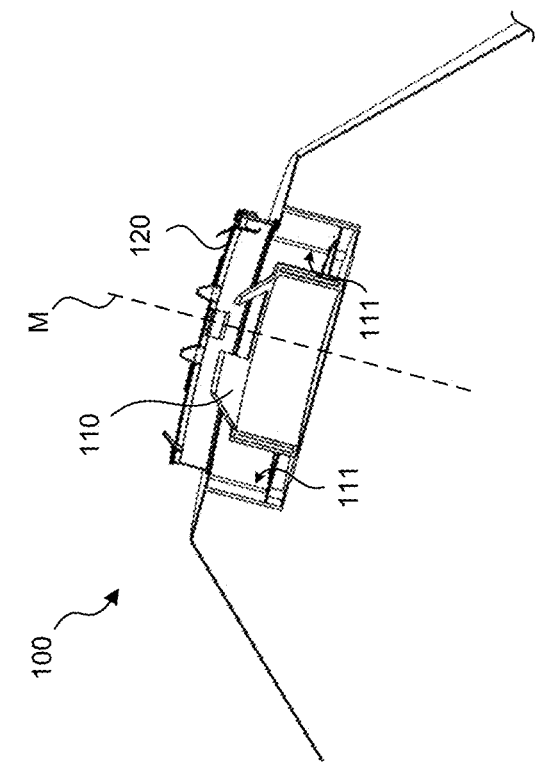
FIG. 2B is an enlarged, partially schematic illustration of a portion of the representative system shown in FIG. 2A having a first connecting element retracted in accordance with embodiments of the present technology.
Figure 2A:
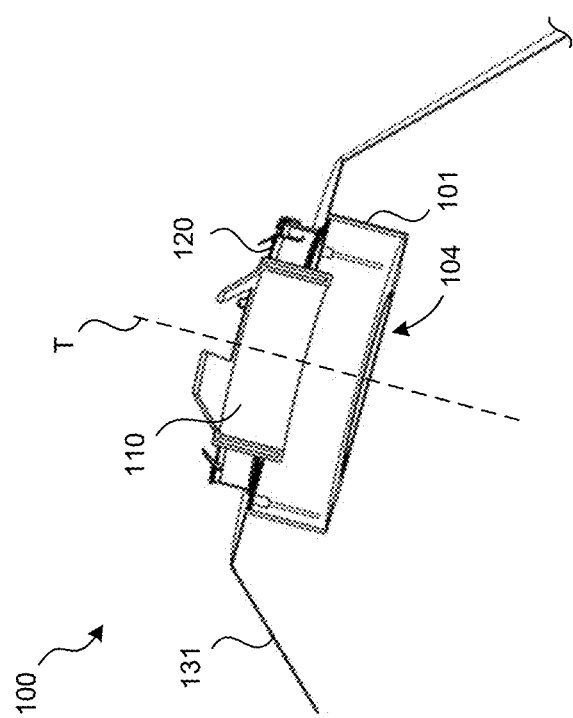
FIG. 2A is an enlarged, partially schematic illustration of a portion of a representative system having a first connecting element extended in accordance with embodiments of the present technology.

FIGS. 2A and 2B are partially schematic, cross-sectional illustrations of portions of the system 100 shown in FIGS. 1A and 1B, respectively. Referring first to FIG. 2A, the system 100 includes a housing 101 that is connected to the bulkhead 131, and that carries the first connecting element 110 and the second connecting element 120. The housing 101 includes a common port opening 104 that allows personnel and/or cargo to be moved into and out of the corresponding vehicle 130 (FIG. 1A) along a transport axis T. In FIG. 2A, the first connecting element 110 is positioned for connecting to a corresponding first spacecraft connecting structure having a first configuration. As shown in FIG. 2A, the first and second connecting elements 110, 120 can be arranged concentrically relative to the common port opening 104 (e.g., concentrically relative to the transport axis T). This arrangement can make the overall system 100 more compact, lightweight, and efficient to use. The use of a common port opening (e.g., as opposed to multiple port openings, one for each connecting element) can also make the system more compact, lightweight, and efficient to use.

In FIG. 2B, the first connecting element 110 has been retracted along a motion axis M, generally parallel to (and in at least some embodiments, collinear with) the transport axis T. In this configuration, the second connecting element 120 is exposed and positioned for connecting to a corresponding second spacecraft structure having a second configuration different than the first configuration. One or more drivers 111 move the first connecting element 110 relative to the second connecting element 120 along the motion axis M.

FIGS. 2C and 2D are partially schematic, cross-sectional illustrations of embodiments of the system 100 shown in FIGS. 2A and 2B, respectively, illustrating further details of the actuation and sealing arrangements. For example, referring first to FIG. 2C, the first connecting element 110 can include a flange 115 that extends radially outwardly from the first connecting element 110 and circumferentially around the first connecting element 110. One or more seals 140 operate to seal the interior of the system 100. For example, the flange 115 can carry a first seal 141 at its outer periphery. The first seal 141 can sealably and slideably engage with a cylindrical housing sidewall 102 of the housing 101. The housing 101 also includes a housing floor 103 through which the common port opening 104 extends. A port hatch 105 can be moveably positioned to cover the common port opening 104 when it is not in use, and expose the common port opening 104 when it is in use.

The driver 111 can include a screw 112 threadably engaged with a nut 113 carried by the first connecting element flange 115. An actuator 114 rotates the screw 112 to move the first connecting element 110 along the motion axis M to a deployed position, as shown by arrow A. Referring now to FIG. 2D, the actuator 114 rotates the screw 112 in the opposite direction to drive the first connecting element 110 in the opposite direction (indicated by arrow B) along the motion axis M. As the first connecting element 110 moves axially along the motion axis M, the first seal 141 continues to seal the interface between the flange 115 and the housing sidewall 102.

Depending upon the arrangement, the system 100 can include a single driver 111, two drivers 111 (as shown in FIGS. 2C and 2D) or more than two drivers 111. The drivers 111 can have a screw-driven nut arrangement, as shown in FIGS. 2C and 2D, or another suitable arrangement (e.g., a telescoping arrangement) for moving the first connecting element 110 and/or the second connecting element 120 relative to each other.

As is also shown in FIGS. 2C and 2D, the overall system 100 can include a controller 170 that receives inputs 171 and directs outputs 172. For example, the controller 170 can receive inputs 171 corresponding to the identity of the vehicle to which the system 100 is to connect, and/or the type of docking configuration to which the system 100 is to connect. Based on this information, the controller 170 can automatically deploy or retract the first connecting element 110, and/or perform other functions associated with the docking maneuver. A generally similar controller arrangement can be used to control the motion of other connecting elements described herein.

Figures 3A, 3B:
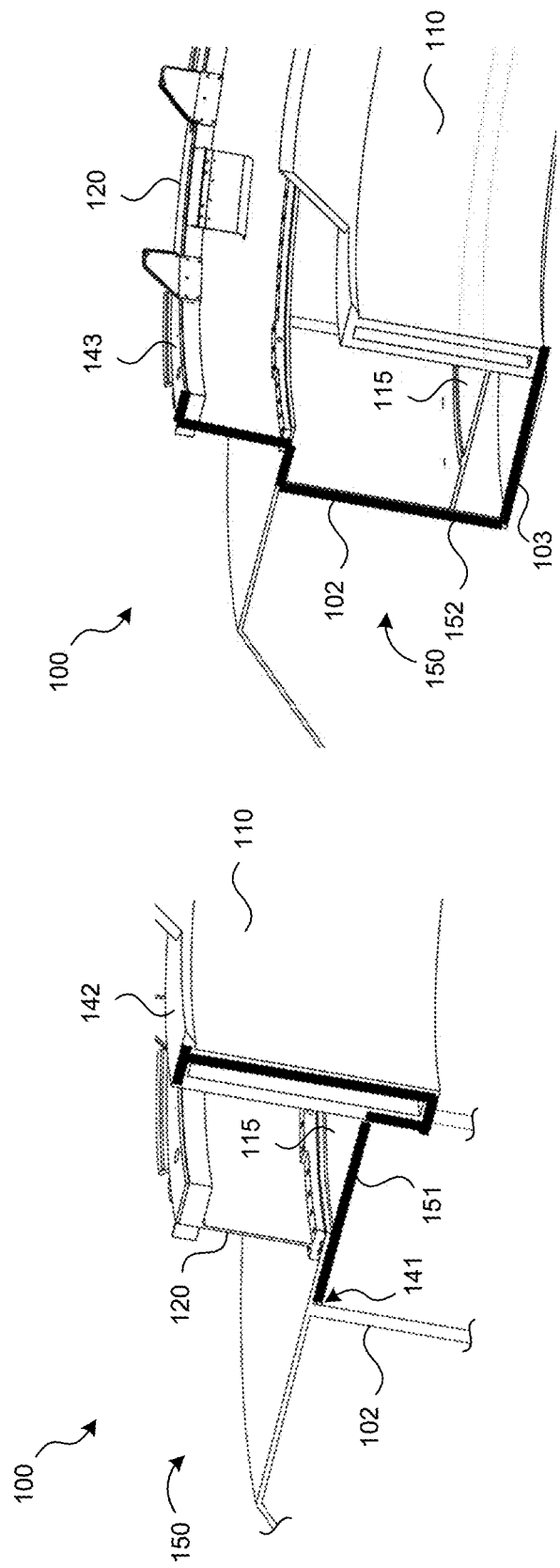
FIGS. 3A and 3B illustrate partially cut-away portions of systems with the first connecting element extended (FIG. 3A), and with the first connecting element retracted (FIG. 3B), along with associated sealing paths, in accordance with embodiments of the present technology.

FIGS. 3A and 3B illustrate the first connecting element 110 in its deployed or extended position (FIG. 3A) and in its retracted or stowed position (FIG. 3B). FIGS. 3A and 3B also illustrate the sealing paths 150 associated with each configuration. Referring first to FIG. 3A, a first seal path 151 is formed by the first seal 141 (as it interfaces with the housing sidewall 102), the flange 115, and the first connecting element 110. The first seal path 151 further includes a second seal 142 that engages with the connecting structure of the corresponding spacecraft of other structure to which the system 100 mates. Referring next to FIG. 3B, when the first connecting element 110 is retracted, a second seal path 152 is formed by the housing floor 103, the housing sidewall 102, the second connecting element 120, and a third seal 143 positioned to engage with a corresponding surface of a corresponding second spacecraft connecting structure.

Figure 4B:
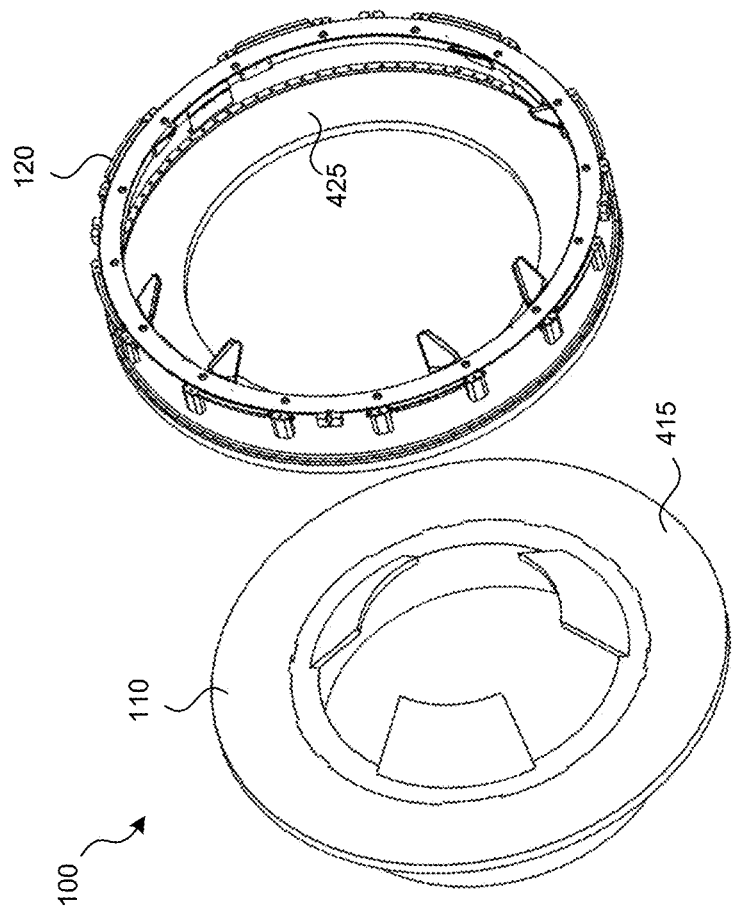
FIG. 4B is a partially schematic illustration of a system that includes a second connecting element ejected in accordance with embodiments of the present technology.
Figure 4A:
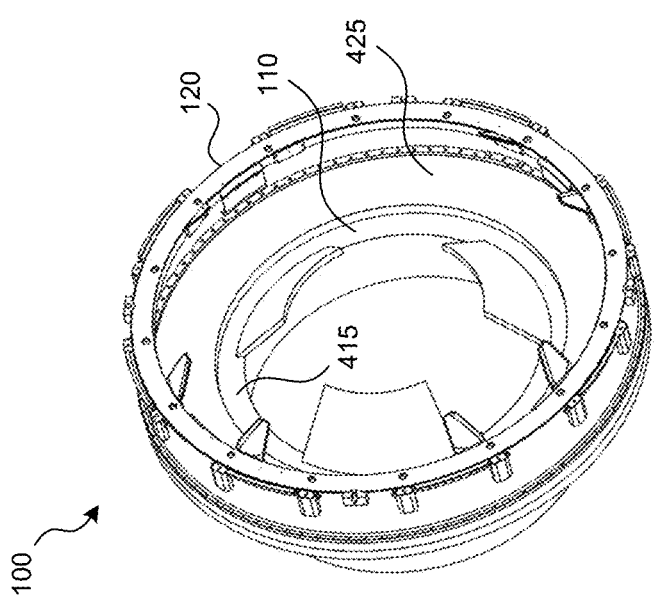
FIG. 4A is a partially schematic, isometric illustration of a system that includes first and second connecting elements sealed in accordance with an embodiment of the present technology.

In the embodiments described above with reference to FIGS. 1A-3B, the first and second connecting elements 110, 120 remain coupled to each other, regardless of whether it is the first connecting element 110 or the second connecting element 120 that is positioned for docking. In other embodiments, one or the other of the connecting elements can be jettisoned instead. For example, FIGS. 4A and 4B illustrate first and second connecting elements 110, 120, with the first connecting element 110 having a first flange 415, and the second connecting element 120 having a second flange 425. In FIG. 4A, the two connecting elements are connected, with the first and second flanges 415, 425 in face-to-face contact. In this embodiment, the second connecting element 120 is positioned for docking. In FIG. 4B, the second connecting element 120 has been jettisoned, leaving the first connecting element 110 positioned for docking.

Figure 5A:
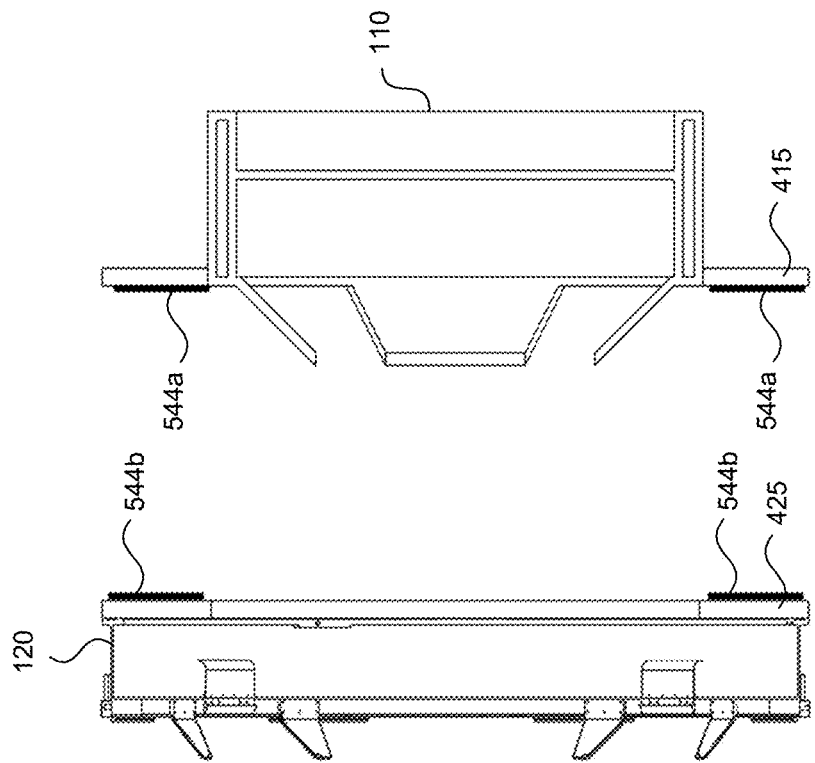
FIGS. 5A and 5B are partially schematic, side elevation views of representative first and second connecting elements in a sealed configuration (FIG. 5A), and with the second connecting element ejected (FIG. 5B), in accordance with embodiments of the present technology.
Figure 5B:
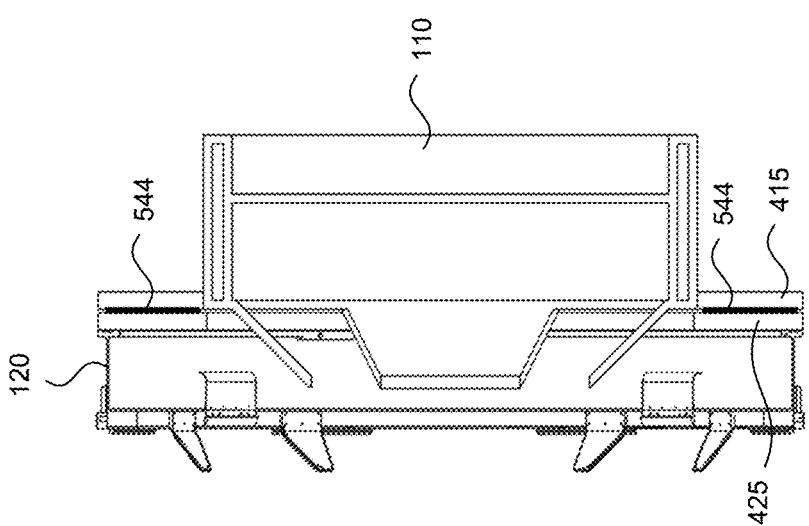

FIGS. 5A and 5B illustrate further details of the arrangement shown in FIGS. 4A and 4B. In particular, in FIG. 5A, the first connecting element 110 and the second connecting element 120 are sealably attached to each other via a fourth seal 544, with the first connecting element 110 recessed away from the second connecting element 120 so that the second connecting element 120 is positioned for docking. In FIG. 5B, the second connecting element 120 has been jettisoned. Accordingly, corresponding seal elements 544a carried by the first connecting element 110 and 544b carried by the second connecting element 120 are disengaged and exposed.

Figure 6B:
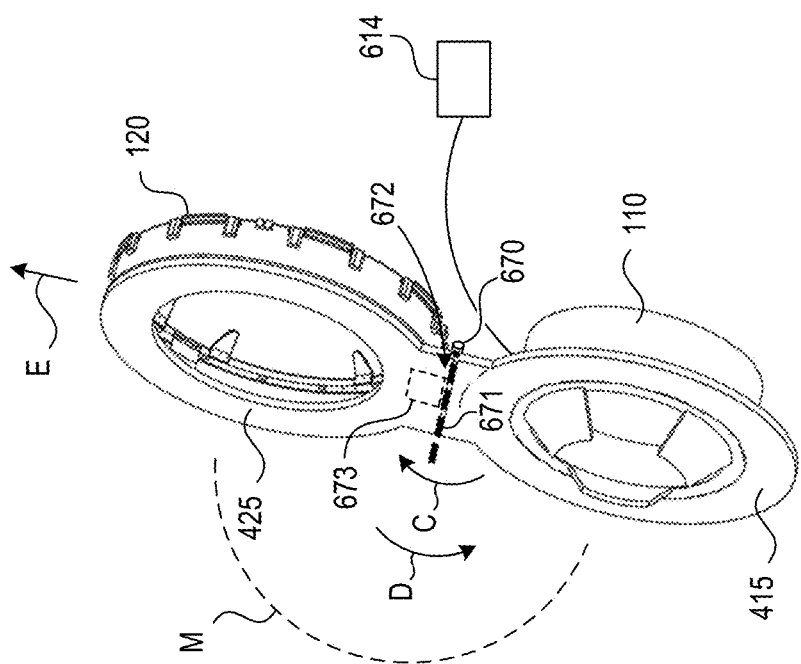
FIG. 6B is a partially schematic, isometric illustration of a system that includes first and second connecting elements hingedly connected to each other, in accordance with embodiments of the present technology.
Figure 6A:
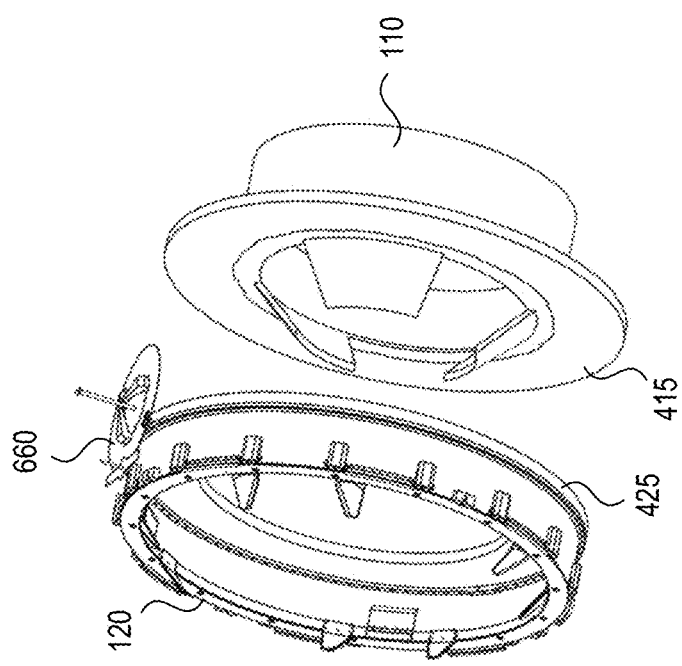
FIG. 6A is a partially schematic, isometric illustration of a system that includes a second connecting element moved via a robotic end effector in accordance with embodiments of the present technology.

FIGS. 6A and 6B illustrate further embodiments in which the first and second connecting elements remain connected to each other, or are otherwise positioned to remain with the vehicle rather than being jettisoned. For example, FIG. 6A illustrates an arrangement of the first and second connecting elements 110, 120 generally similar to that shown in FIGS. 5A and 5B, but with an end effector 660 positioned to controllably move the second connecting element 120 away from the first connecting element 110 when the vehicle is to use the first connecting element 120 for a docking/berthing operation. The end effector 660 can be carried by a robotic arm and/or other actuatable mechanism (not shown in FIG. 6A for purposes of clarity).

In FIG. 6B, the first connecting element 110 and the second connecting element 120 are coupled via a hinge 670 having a hinge line 671. Accordingly, the corresponding motion axis M is arcuate. When the first connecting element 110 is to be used, the second connecting element 120 is pivoted away from the first connecting element 110, as shown by arrow C. When the second connecting element 120 is to be used, it is pivoted over the first connecting element 110, as shown by arrow D. Accordingly, the second connecting element 120 can remain attached to the first connecting element 110 whether it is in use or not.

In at least some embodiments, the second connecting element 120 can move along one or more additional axes, for example, to move it radially out of the way when the first connecting element 110 is in use. For example, the system 100 can include a telescoping mechanism 672, e.g., having a track 673 along which the second connecting element 120, or a portion of the second connecting element 120, moves radially away from the first connecting element 110 (as shown by arrow E) to avoid interference.

A corresponding actuator 614 (shown schematically in FIG. 6B) can move the second connecting element 120 relative to the first connecting element 110. For example, the actuator 614 can be carried by the first connecting element 110, and can include a rotary actuator that pivots the second connecting element 120 toward and away from the first connecting element 110, as indicated by arrows C and D. In other embodiments, the actuator 614 can have other configurations.

One feature of several of the embodiments described above is that the single connecting system can include multiple spacecraft connecting elements, each of which is compatible with a connecting element of a different type or configuration. An advantage of this arrangement is that it can allow a single docking mechanism to interface with spacecraft having any of at least two different configurations.

Another feature of at least some of the foregoing embodiments is that each mechanism can be moved out of the way to allow the other mechanism to be positioned for docking. An advantage of this arrangement is that it avoids interference between the two connecting mechanisms. In some embodiments, one connecting element can be jettisoned to expose the other for docking. In other embodiments one connecting element can be moved, without jettisoning it, to allow the other connecting mechanism to be positioned for docking. An advantage of jettisoning one connecting element is that it can be simpler to use and can weigh less than a mechanism that keeps both connecting elements attached. Conversely, an advantage of keeping both connecting elements attached to the spacecraft is that both connecting elements can be used repeatedly.

The foregoing docking systems can be used in a variety of suitable contexts. For example, the space vehicle 130 shown in FIGS. 1A and 1B, can be, or can include, a habitat module 132 that is attached to other habitat modules or to a space station to increase the habitable volume of the space station. In other embodiments, the vehicle 130 can include an emptied or used fuel tank 134 that is converted to a habitat module and attached to other habitat modules or a space station. In still further embodiments, the vehicle 130 can include a cargo or personnel capsule that can be docked with another cargo and/or personnel capsule, space station, or other space structure.

From the foregoing, it will be appreciated that specific embodiments of the present technology have been described herein for purposes of illustration, but that various modifications that may be made without deviating from the technology. For example, the connecting elements of the system may be moved via motor-driven bolts and/or nuts in some embodiments, or via separation nuts, clamps, and/or other devices well known to those of ordinary skilled in the relevant art. The seals described above may have configurations other than those specifically disclosed in the Figures. Particular embodiments disclosed herein relate to specific, well-known connecting configurations, for example CBM configurations and IBDM configurations. In other embodiments, generally similar connecting element arrangements can be used to dock with spacecraft having other docking mechanism configurations. The docking systems can include two different connecting elements, or more than two different connecting elements, e.g. for compatibility with more than two corresponding docking arrangements.

Certain aspects of the technology described in the context of particular embodiments may be combined or eliminated in other embodiments. Further, while advantages associated with some embodiments of the present technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" as in "A and/or B" refers to A alone, B alone and both A and B.

I claim:
1. A spacecraft system, comprising:
    a connecting device, the connecting device including:
        a housing having a common port opening;
        a first connecting element carried by the housing and configured to connect with a corresponding first spacecraft connecting structure having a first configuration; and
        a second connecting element independent from the first connecting element and carried by the housing, in a position that is radially outward from the first connecting element, and configured to connect with a corresponding second spacecraft connecting structure having a second configuration independent from the first configuration;
    wherein at least one of the first connecting element and the second connecting element is moveable relative to the other between an operational position in which the first connecting element projects from the second connecting element and a non-operational position in which the first connecting element is recessed with respect to the second connecting element; and
    wherein each of the first connection element and the second connecting element, when connected to the corresponding first spacecraft connection structure or the second spacecraft connecting structure, is configured to allow transport through the common port opening.

2. The spacecraft system of claim 1, wherein the first connecting element and the second connecting element are concentrically located relative to the common port opening.

3. The spacecraft system of claim 1, wherein the first connecting element is positioned concentrically inwardly with respect to the second connecting element.

4. The spacecraft system of claim 1, wherein the common port opening is positioned around a transport axis, and wherein the first connecting element is extendible and retractable along a motion axis that is parallel to the transport axis.

5. The spacecraft system of claim 4, further comprising a driver to extend and retract the first connecting element along the motion axis.

6. The spacecraft system of claim 5, wherein the driver includes:
    a nut carried by the first connecting element;
    a screw threadably engaged with the nut; and
    an actuator coupled to the screw to rotate the screw and drive the nut axially along the motion axis.

7. The spacecraft system of claim 1, further comprising a spacecraft, and wherein the connecting device is attached to and carried by the spacecraft.

8. The spacecraft system of claim 7, wherein the spacecraft includes a fuel tank.

9. The spacecraft system of claim 7, wherein the spacecraft includes a habitat module.

10. The spacecraft system of claim 1, wherein the spacecraft includes a fuel tank that is convertible in space to a habitat module.

11. A system, comprising:

a connecting device, the connecting device including:

a housing having a common port opening;

a first connecting element carried by the housing and positioned to connect with a corresponding first spacecraft connecting structure having an International Berthing and Docking Mechanism (IBDM) configuration; and a second connecting element carried by the housing, in a position that is radially outward from the first connecting element, and positioned to connect with a corresponding second spacecraft connecting structure having an Active Common Berthing Mechanism (ACBM) configuration;

wherein at least one of the first connecting element and the second connecting element is moveable relative to the other between an operational position in which the first connecting element projects from the second connecting element and a non-operational position in which the first connecting element is recessed with respect to the second connecting element; and wherein each of the first connecting element and the second connecting element, when connected to the corresponding first spacecraft connecting structure or second spacecraft connecting structure, is positioned to allow transport through the common port opening.

12. The system of claim 11, wherein the first connecting element and the second connecting element are concentrically located relative to the common port opening.

13. The system of claim 11, further comprising a spacecraft, and wherein the connecting device is attached to and carried by the spacecraft.

14. The system of claim 11, further comprising:

a flange positioned concentrically outwardly from the first connecting element;

a first seal at an interface between the flange and the housing;

a second seal on an outer surface of the first connecting element, the second seal configured to seal the first connecting element to the corresponding first spacecraft connecting structure; and a third seal on an outer surface of the second connecting element, the third seal configured to seal the second connecting element to the corresponding second spacecraft connecting structure.

15. The system of claim 11, further comprising:

a controller; and a driver, wherein the controller implements instructions to control the driver to move the first connecting element between the operational position and the non-operational position.

16. A connecting device, comprising:

a housing having a common port opening;

a first connecting element carried by the housing and configured to connect with a corresponding first spacecraft connecting structure having a first configuration;

a second connecting element independent from the first connecting element and carried by the housing, in a position that is radially outward from the first connecting element, and positioned to connect with a corresponding second spacecraft connecting structure having a second configuration independent from the first configuration;

a driver configured to extend and retract the first connecting element relative to the second connecting element; and a controller configured to execute instructions to control movement of the driver;

wherein each of the first connecting element and the second connecting element, when connected to the corresponding first spacecraft connecting structure or the second spacecraft connecting structure, is positioned to allow transport through the common port opening.

17. The connecting device of claim 16, wherein the first connecting element is positioned in an operational position when the first connecting element projects from the second connecting element and the first connecting element is positioned in a non-operational position when the first connecting element is recessed with respect to the second connecting element.

18. The connecting device of claim 16, wherein the first connecting element and the second connecting element are concentrically located relative to the common port opening.

19. The connecting device of claim 16, wherein the common port opening is positioned around a transport axis, and wherein the first connecting element is extendible and retractable along a motion axis that is parallel to the transport axis.

20. The connecting device of claim 19, wherein the driver includes:

a nut carried by the first connecting element;

a screw threadably engaged with the nut; and an actuator coupled to the screw to rotate the screw and drive the nut axially along the motion axis.

* * * * *